United States Patent

Minart

[15] 3,673,085

[45] June 27, 1972

[54] METHOD AND APPARATUS FOR TREATING SOLUTIONS BY SOLID-ION EXCHANGERS

[72] Inventor: Paul Minart, Grenoble, France

[73] Assignee: Societe Grenobloise d'Etudes et d'Applications Hydrauliques, (Sogreah), Grenoble, France

[22] Filed: Nov. 19, 1969

[21] Appl. No.: 878,013

[30]   Foreign Application Priority Data

Nov. 21, 1968  France...................................685293

[52] U.S. Cl.............................................210/33, 210/189
[51] Int. Cl.........................................................B01d 15/02
[58] Field of Search.......................23/270, 310; 210/33, 189

[56]   References Cited

UNITED STATES PATENTS

| | | | |
|---|---|---|---|
| 3,445,382 | 5/1969 | Wace | 210/189 X |
| 2,908,596 | 10/1959 | Ruth | 23/270 X |
| 2,973,319 | 2/1961 | Porter | 210/189 X |
| 2,699,379 | 1/1955 | Luque | 23/271 |
| 2,963,431 | 12/1960 | Dorn et al. | 210/33 |
| 2,730,239 | 1/1956 | Peery | 23/270 X |
| 3,503,510 | 3/1970 | Minart et al. | 210/189 |

*Primary Examiner*—Samih N. Zaharna
*Attorney*—Sylvester J. Liddy, John J. Hart, Joe E. Daniels and Charles E. Baxley

[57]   ABSTRACT

An installation for the treatment of solutions by solid ion exchangers in a mobile bed, comprising an initial chamber formed by a central cylindrical column, followed by an even number of successive concentric annular chambers surrounding at least part of the central column, the exchange media rising up through the said column, spilling over the whole periphery of its top edge down into the first annular chamber, and passing from the bottom of the latter to the bottom of the second annular chamber. The flow of liquid in the column and the two chambers occurs in directions opposite to the directions of movement of the bed therethrough and whenever two liquids of different densities are present in the same chamber, the denser liquid is below the lighter liquid and is separated therefrom by an interface. The inlet and outlet flow rates of each liquid are controlled to keep the movements of an interface between certain limits during the operation of the installation.

10 Claims, 4 Drawing Figures

INVENTOR.
PAUL MINART

INVENTOR.
PAUL MINART

INVENTOR.
PAUL MINART
BY
ATTORNEY

3,673,085

METHOD AND APPARATUS FOR TREATING SOLUTIONS BY SOLID-ION EXCHANGERS

THE INVENTION

The invention relates to the treatment of chemical solutions by intermittently moving-bed solid ion exchange media and has for its primary purpose the provision of an improved method of and apparatus for effecting such treatment.

Installations for practicing the indicated type of treatment are usually constructed to perform several distinct operations during which the solid exchange media are brought into contact with several liquids in successive treatment zones. Thus, in addition to a phase in which the solution to be treated is exhausted, such operations may, for example, comprise also a phase in which the exchange media are rinsed through in order to recover the solution in which they are impregnated, followed by a regeneration phase and a washing phase. Further, the liquids that are used in these several operations often have very different densities. As an instance, the solution to be treated and the regenerant usually are denser than the washing and rinsing liquids. As a result of these factors there exists in these prior installations a tendency of the liquids involved to become intermixed by density gradient formation.

The primary purpose of the present invention is to provide an improved installation of the indicated type which can handle the several liquids utilized in the practice of the process so as to prevent any mixing action of such liquids by density gradient formation. The installation is designed for the treatment of solutions by intermittent moving-bed solid ion exchange media. A characteristic feature of the installation is that it basically comprises a plurality of successive treatment chambers in which is contained a continuous solid ion exchange bed that progresses intermittently by rising up through one treatment chamber and then sinking down through the next, and so on. The flow of liquid through such successive chambers occurs in the opposite direction, i.e. down through the first of the said chambers and up through the next, with the density of the liquid in each chamber decreasing from bottom to top, and with suitably positioned inlet and outlet points being provided to that end.

In a preferred layout according to the invention, the installation comprises an initial chamber consisting of a central cylindrical column, followed by an even number of concentric annular chambers surrounding at least part of the central column. The exchange media rises up inside the central column, spills over the whole periphery of its top edge down into the first annular chamber, then passes from the bottom of the latter chamber through a continuous of discontinuous passage underneath a wall separating such first chamber from a second annular chamber, to the bottom of the second chamber, and then rises up inside the latter. The mixing media can then be evacuated and fed back into the foot of the column so as to start the cycle all over again. However, if the number of treatment operations so requires, the mixing media can be made to pass from said second chamber into two additional chambers concentric with the first two chambers, and moving down through one and up through the other of such additional chambers in the manner indicated with respect to the first two chambers before finally emerging and being recycled into the circuit.

It is believed that a clearer understanding of the invention will be obtained from the following description of a non-limitative example of an installation for the treatment of a solution. Before entering into a consideration of such description it is desired to first point out that the described treatment comprises a phase in which the solution is exhausted, a phase in which the exchange media are rinsed through, a regeneration phase and a phase in which the exchanged media are washed.

In perusing such description reference should be made to the accompanying drawings, in which FIG. 1 is a schematic view of a treatment unit comprised of three successive chambers arranged in accordance with the invention;

Figure 1:
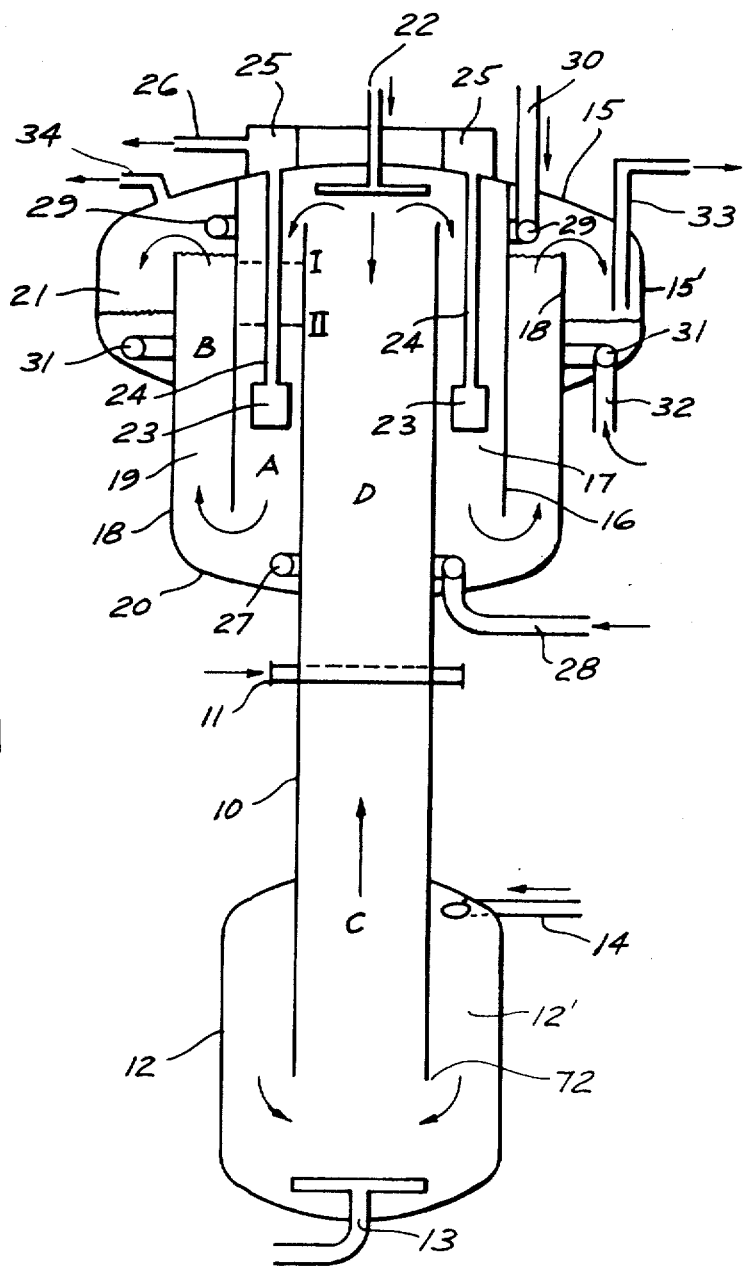
Figure 2:
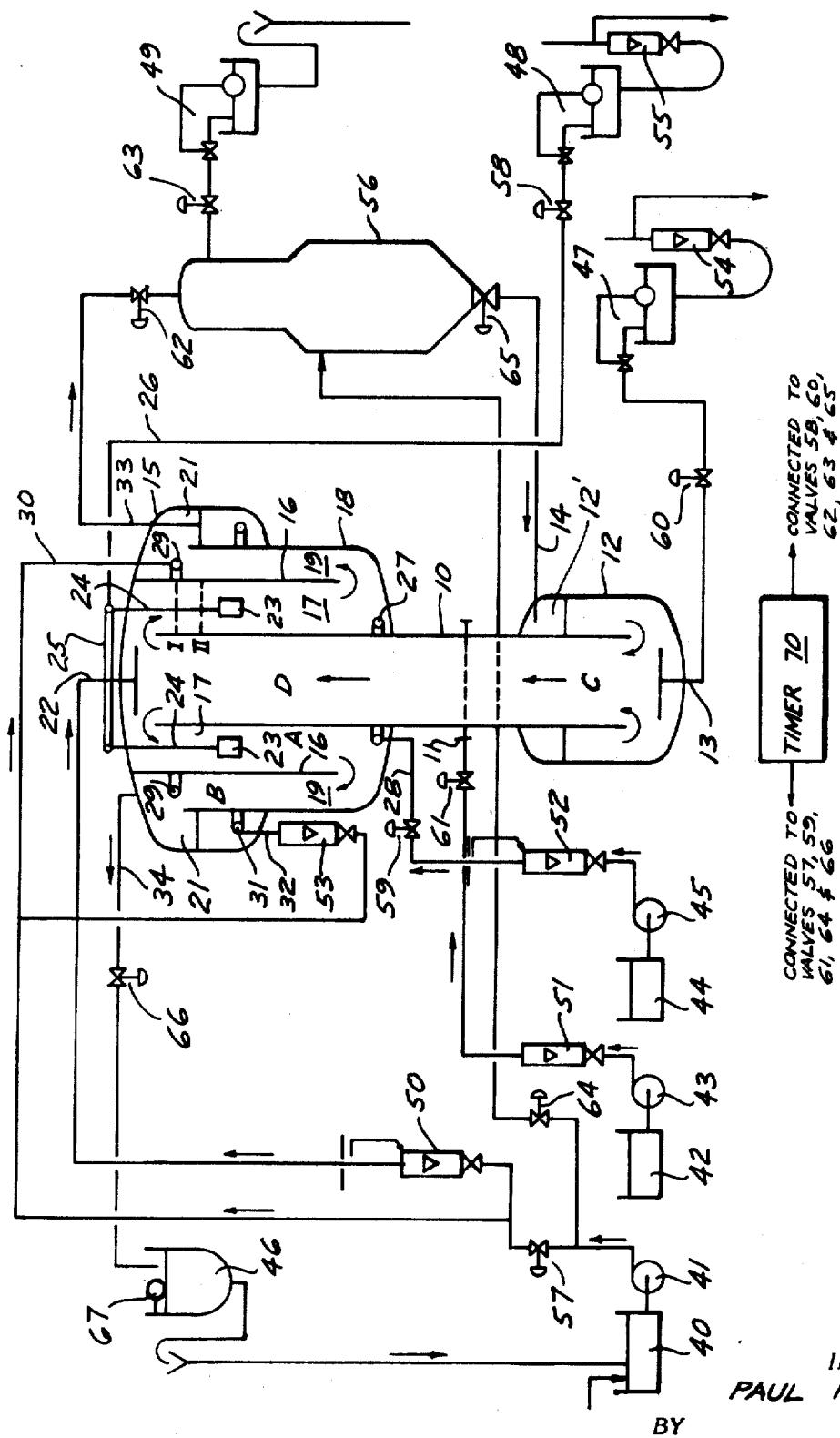
FIG. 2 is a schematic view of an overall installation embodying the treatment unit of FIG. 1.

The treatment unit shown in FIGS. 1 and 2 of the drawings, comprises a central column consisting of a cylindrical body 10 provided with a liquid inlet 11. The column 10 is supported by an enlarged, closed, substantially cylindrically-shaped base 12 so that its bottom end 72 is spaced upwardly from the bottom wall of the base 12 and the bottom end portion thereof enclosed by such base forms with the latter an annularly-shaped chamber 12'. The base 12 is provided in its lower part with a liquid outlet 13 and in its upper part with a tangential inlet 14 for the exchange media to be recycled.

Above and around the upper half of cylindrical body 10 there is provided an assembly composed of a top end cover 15 which overlies and encloses both the top end portion of the body 10 and the upper part of an open cylindrically-shaped vessel 20 which surrounds the upper part of body 10. The cover 15 has an inner depending cylindrical wall 16 which extends down into the annular space formed between the upper part of the body 10 and the exterior cylindrical side wall 18 of the vessel 20. The inner cylindrical wall 16 forms the outer boundary of an inner annular chamber 17 surrounding cylindrical body 10, and the outer cylindrical wall 18 forms the outside boundry of an outer annular chamber 19 surrounding both the body 10 and the inner annular chamber 17. The bottom 20 of the vessel forms a common bottom for both annular chambers 17, 19 and is spaced below the inner depending wall 16 to provide a communicating space between the two annular chambers underneath wall 16. The outside or side wall 15' of the top cover 15 forms with the upper portions of the walls 16 and 18 an annular vessel 21.

A liquid feed 22 extends downwardly through the central portion of the top end cover 15 and underneath such end cover discharges the washing liquid over the bed in the cylindrical body 10. The inner annular chamber 17 contains liquid outlet screens 23 at an appropriate level. The screens 23 are connected by tubes 24 to a manifold 25 mounted on the top of the end cover 15 and provided with an outlet pipe 26. At the foot of annular chamber 17, near the bottom 20 of vessel 18, there is provided a ring pipe 27 having suitably distributed outlet orifices and connected to a liquid feed pipe 28. Just above the top of the outer annular chamber 19 there is provided a second ring pipe 29 having suitable outlet orifices and connected to a liquid feed pipe 30. Provided in the bottom of the annular vessel 21 is a third ring pipe 31 with suitable outlet orifices and connected to a liquid feed pipe 32. There also extends about half way down into the vessel 21, an outlet pipe 33. Also in communication with the upper portion of the vessel 21 above the annular chamber 19 is a liquid outlet pipe 34 provided in the top end cover 15.

It will be understood that in accordance with the invention the chamber 12' of base 12 is filled with solid exchange media up to a certain level above the lower end 72 of the cylindrical body 10. The solid exchange media fills the body 10 up to top end cover 15, fills the inner annular chamber 17 completely, fills the outer annular chamber 19 up to the top edge of wall 18, and fills the vessel 21 up to a certain level. Liquid is fed in through a pipe 32 and a ring pipe 31 to fluidize the exchange media in vessel 21. Part of such fluidized exchange media is carried by the fluidized liquid out through a pipe 33 during the advancing movements of the bed of exchange media.

The exchange media with entraining fluid are fed back intermittently through pipe 14 into the upper annular part of the chamber 12' formed in the base 12. The pressure of the entraining fluid is such that the exchange media in the chamber 12' is caused to move downwardly towards the bottom of chamber 12' and through the opening below the bottom end 72 of the cylindrical body 10 in the arrowed directions. Such exchange media then rise up through the cylindrical body 10 and pass between its upper edge and top end cover 15, and from there they pass down through the inner annular chamber 17, underneath the inner wall 16, up through the outer annular chamber 19 and finally over the top of the outer wall 18 into vessel 21.

The relatively dense solution to be treated is fed in through pipe 28 and ring pipe 27 and rises up through exhaustion zone A to the screens 23. The treated solution passes into the screens 23, and up the tube 24, into the manifold 25 from where it is discharged through the pipe 26.

A rinsing liquid of lower density than the solution to be treated is fed in through the pipe 30 and ring pipe 29 and passes from such ring pipe down through rinsing zone B. From the bottom of zone B, the rinsing liquid passes under wall 16 and up through zone A, and finally discharges with the exhausted solution through the screens 23.

A liquid regenerant is fed into the cylindrical body 10 through the inlet 11, and passes downwardly through zone C of the bed and then out through the liquid outlet 13. Simultaneously, a washing liquid fed in at the liquid feed 22 passes down through the zone D of the portion of the bed in the cylindrical body 10 and through the zone C thereof to emerge with the regenerant liquid through the outlet 13.

FIG. 2 is a general diagram of an installation in which is embodied the treatment unit illustrated in FIG. 1 and showing the manner in which the feed and outlet pipes, flow control, adjustment and shut-down arrangements, pumps and other operating equipment may be combined. In this installation, the washing and rinsing inlets 22 and 30 are supplied simultaneously from a liquid tank 40 by means of a pump 41. An even volume flow of the washing and rinsing liquid is furnished to the tank 40 from a tank 46. The regenerant liquid is fed to the inlet 11 from a regenerant tank 42 by a volumetric pump 43. The fluid for treatment is contained in a tank 44 and fed therefrom by a pump 45 to the supply ring pipe 27.

The arrangements in FIG. 2 designated 47, 48 and 49 control discharge of the several liquids from downstream. The arrangements 50 and 52 control the discharge of the washing liquid and fluid for treatment, respectively, from upstream. The reference numerals 51, 53, 54 and 55 designate discharge indicators. The tank designated 56 is a receiver in which any impurities in the treated solution are removed from the exchange media. The reference numerals 57, 58, 59, 60, 61, 62, 63, 64, 65 and 66 designate automatic control valves, which are connected to and controlled by a time switch 70 in a manner well known in the art.

The installation shown in FIG. 2 of the drawings operates in the following manner:

While the treatment is in progress, valves 57, 58, 59, 60, 61 and 62 are open and the inflow through the pipe 30 is automatically matched to the outflows controlled from downstream by the arrangements 47, 48 and 49. These valves close at set time switch-controlled intervals when the treatment stops. Valves 64, 65 and 66 then open and the liquid discharging through them causes the expulsion under force of the exchange media in receiver 56 into the chamber 12' of the base 12, thereby causing the exchange media to move on into the treatment unit. After about 10 seconds tank 46 is full, float 67 closes the valves 64, 65 and 66 and opens the valves 57, 58, 59, 60, 61 and 62. After about 20 seconds valve 63 opens and then remains open for a length of time which is adjustable and is shorter than the treatment time. The cycle then starts all over again.

During the aforesaid operation of the system, an interface forms in the upper part of zone A in the inner annular chamber 17 between the treated solution and washing liquid. No mixing between these two liquids due to a density gradient can occur because the denser treated solution is underneath. During the intermittent downward movements of the exchange media in the chamber 17, the aforesaid liquid interface will move downwardly with them through zone A. In order to ensure that the interface during such downward movements of the exchange media, does not sink down to the level of the screens 23 in chamber 17, which would cause washing liquid to be carried away with the treated solution, the various rates of flow drawn off are controlled downstream so that the interface rises back to its initial position during the treatment periods. The interface thus fluctuates between the position I and the position II indicated in FIGS. 1 and 2 of the drawings. The screens 23 in chamber 17 must be set at a level which ensures that they always remain below position II of the interface during the operation of the installation.

The above description applies to a steady-state operation of the installation. To take care in time of possible variations of discharge, or in the concentration of the liquid to be treated, the column should be designed for a maximum treatment capacity associated with a maximum exchange media output, and also maximum regenerant and effluent discharge.

In the case where a softening process is applied to a solution, a hardness pick-up is fitted to the treated solution outlet of the installation and the time switch 70 controlling the cycle is set for a given time interval, for example 6 minutes. With such an arrangement, the valves 58 and 59 will remain open on completion of a cycle, but valves 57, 60 and 61 will close and the regenerant pump 43 will stop, but the treatment will continue. The time switch 70 will not set the cycle going again (i.e. stop treatment and set the exchange media in motion) until the resistivity of the softened water reaches its maximum set value. The regenerant and effluent flows are thus controlled at their maximum rates, but are periodically interrupted so that the regenerant consumption can be matched to the treated water discharge and concentration.

In the operation of the installation, the quality of exchange media in each charge remains constant and is set once and for all. The hourly bed movement frequency will vary according to requirements, but of course should always remain below maximum frequency.

Figure 3:
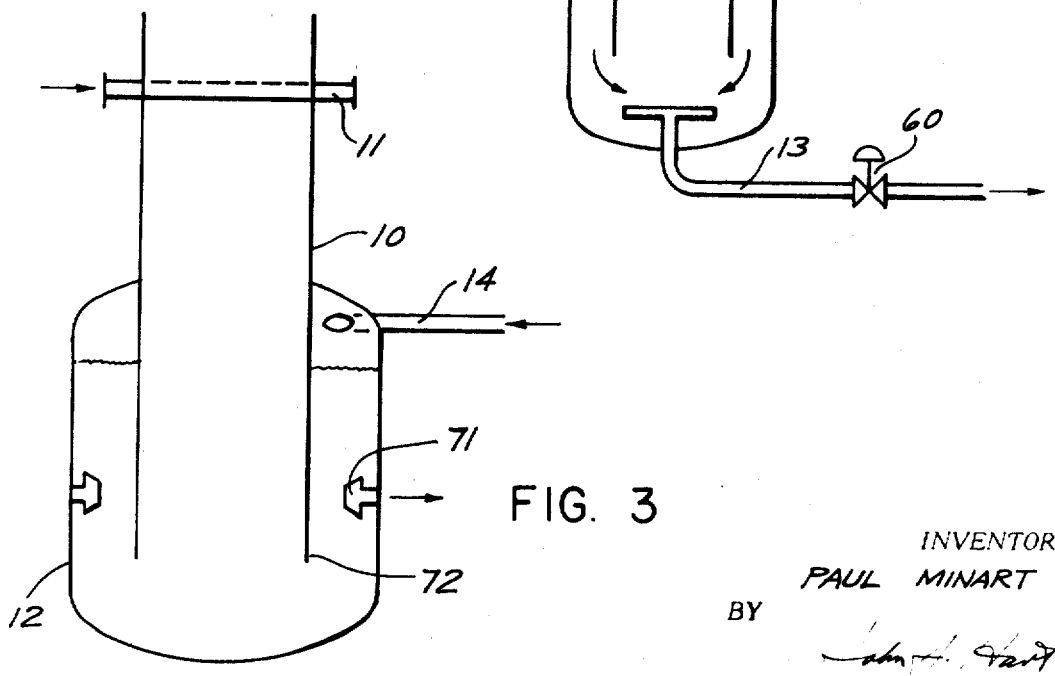
FIG. 3 is a schematic view showing a modification of the unit illustrated in FIG. 1

Experience has shown that whenever the regeneration liquid is heavier than the liquid giving the impulse, when the effluent is drawn off at the foot of the column at 13, the impulse-giving water from pipe 14 will be underneath the denser regenerant fed in at 11, and the regenerant will then tend to follow preferential paths, which adversely affects the regeneration process. This phenomenon can be prevented by providing suitable outlet filters 71 in the base 12 to draw off the effluent in the peripheral zone at the foot of the column as is shown in FIG. 3 of the drawings. The distance between the plane or level at which the effluent outlet filters 71 are located and the bottom part 72 of the cylindrical casing 10 should be such as to provide an annular zone at the foot of column 10 in the base chamber 12' sufficient to ensure that the interface between the impulse-giving water from the pipe 14 and the regenerant remains in such annular zone when the impulse takes place. The plane of the outlet filters 71, however, should not be too high up, for with the annular section and effluent discharge arranged as they are, the resin bed in the aforesaid annular or peripheral zone might fluidize under such a condition, with the result that the resin bed would no longer be stable.

Figure 4:
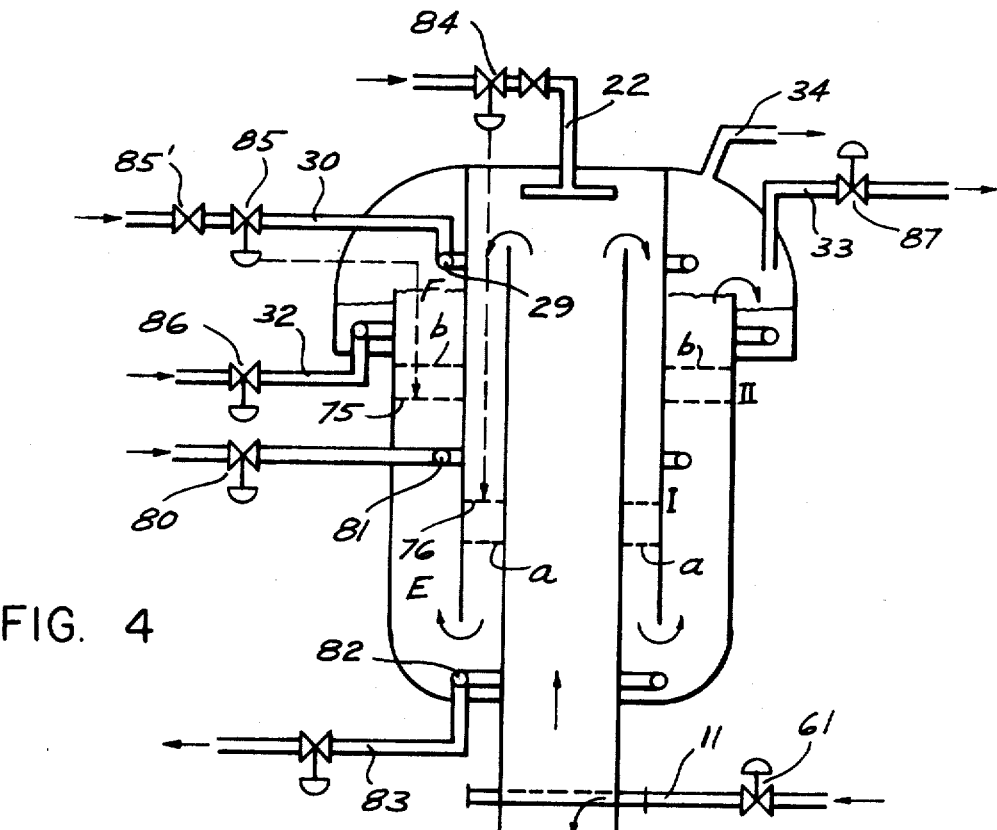
FIG. 4 is a schematic view showing how the treatment unit of FIG. 1 may be further modified to effect a different liquid circulation.

FIG. 4 of the drawings shows an alternative form of the invention in which the liquid circulation in the concentric annular chambers is different from that shown in the embodiment of FIG. 1. In this alternative form of construction, the solution for treatment is fed into the outer annular chamber via a pipe 80 and filter 81, from which it passes down through the exhaustion zone E in the lower part of such chamber and out of such chamber through a filter 82 and pipe 83. The rinsing liquid is fed into the outer annular chamber via a pipe 30 and filter 29, from which it passes down through the washing zone F in the upper part of such chamber and then through zone E of such chamber and finally passes out with the exhausted solution through the filter 82. As in the manner of the construction shown in FIG. 1 of the drawings, the fluidization liquid is fed into the upper cover chamber through a pipe 32, and the fluidized media passes out of such chamber through the pipe 33, the washing liquid is fed into the bed through the pipe 22, the brine is fed into such bed through the pipe 11 and the effluent discharges from the bed in column 10 through the pipe 13.

In the arrangement shown in FIG. 4, the interface $a$ in the inner annular chamber and the interface $b$ in the outer annular chamber between the treated solution and the washing liquid are kept at the two limit positions I and II by resistance cells 75 and 76 which control the opening of the washing liquid inlet valve 84 and the closure of the rinsing liquid inlet valve 85, respectively.

In the operation of the arrangement shown in FIG. 4, the inner annular chamber interface $a$ is controlled as follows:

When the impulse occurs, the portion of the resin bed in the inner annular chamber moves downwardly. During such movement of this bed portion, interface $a$ between the treated solution and washing liquid sinks, so that it must be raised to maintain it at level limit I. Washing of the resin in the washing zone F is initiated by controlling from downstream a higher effluent discharge at 13 than the brine inflow at 11 controlled from upstream. The washing valve 84 remains shut after the impulse, and therefore, due to a higher pressure at the treated solution outlet 83 than at the effluent outlet 13, the interface $a$ will be caused to rise. When the solution for treatment reaches cell 76 in the inner chamber, valve 84 in the washing circuit 22 is caused to open. If however, the washing inflow at 22 is too small, the interface $a$ keeps on rising, and it is necessary to increase the washing flow at 22 until it and the brine inflow at 11 together exceed the effluent discharge at 13. Interface $a$ then falls, causing cell 76 to close valve 84, and so on. Interface $a$ is in this manner controlled so that it can never rise above level limit I.

The upper interface b is controlled as follows:

When the impulse occurs with a consequent rise of the portion of the resin bed in the outer annular chamber, the interface $b$ between the treated solution and the rinsing liquid in the outer annular chamber rises and, therefore, must be made to fall again in order to maintain it at level limit II. The upstream discharge regulation arrangements for the fluidization system 32 and the rinsing system 30 in FIG. 2 are not required in this layout. On resumption of treatment, cell 75, which is full of solution, actuates rinsing valve 85, which opens and the interface $b$ begins to fall. After about 20 seconds have elapsed, the time switch 70 controlling resin entrainment starts operating and causes both the fluidization valve 86 and the entrainment valve 87 to open simultaneously. The consequent fluidization inflow through pipe 32 is controlled so that it is at a slightly lower rate than the entrainment flow discharging flow pipe 33 controlled from downstream so that the interface $b$ will start to fall. In order that the interface $b$ will continue falling, the combined rinsing and fluidization flows should exceed the rate of entrainment flow. When the interface $b$ has fallen back to its correct level whereat the rinsing water reaches the cell 75, valve 85 is caused to close. To prevent the interface $b$ from rising again, the rate of flow of the rinsing flow is so adjusted by means of hand valve 85' that valve 85 will close after entrainment ceases and before the next impulse takes place. For example, if impulses occur every 6 minutes, the entrainment time will be set at 3 minutes and the rinsing flow will be set at a value such that valve 85 closes during the time interval between 3 and 6 minutes.

What is claimed is:

1. An installation for the treatment of liquids by solid ion exchangers in a mobile bed, comprising a treatment vessel for a single bed of solid ion exchangers constructed to provide a plurality of successive bed containing chambers concentrically arranged to be in annular communication at the ends thereof so as to enable the formation therein of a single continuous bed having a plurality of vertically disposed parts, means to move a continuous compact mobile bed in said chambers under the impulsion of liquid so that parts of such bed move simultaneously upwardly and downwardly through said communicating chambers, means for supplying liquids to said vessel so that they flow counter to the movements of bed parts in said chambers and provide separate treatment zones along the length of a compact mobile bed extending continuously in said successive chambers, said supplying means including liquid inlet means associated with two chambers containing treatment zones to provide two liquids of different densities in each of such two chambers, the liquid inlet means for the lighter liquids in such two chambers being associated with the upper ends of such chambers, so that the lighter liquids are supplied to the upper portions of such two chambers and above the places of supply of the denser liquids thereto, one of said two chambers containing a treatment zone having a first inlet for the denser liquid located between the upper and bottom ends of said one chamber and a first liquid outlet at the bottom of said one chamber for the discharge of both the lighter and denser liquids supplied to said one chamber, another of said two chambers containing a treatment zone having a second inlet for a denser liquid and a second outlet for such denser liquid, one of said second inlet and second outlet being located intermediate the upper and bottom ends of said other chamber and the other being associated with the bottom end of said other chamber, and control means associated with said supplying means to control the position of an interface between the lighter and denser liquids in said other chamber.

2. An installation as defined in claim 1, in which said one chamber is the central chamber of said concentric chamber arrangement, and has a vertical dimension substantially greater than the vertical dimensions of the other chambers, in which said bed moving means is constructed to displace the bed upwardly in such central chamber, and in which said supplying means includes means for supplying a washing liquid to the liquid inlet associated with the upper end of such central chamber, and means for supplying a regenerant liquid to said first inlet for a denser liquid, the regenerant and washing liquids passing downwardly through said central chamber being discharged through said first liquid outlet at the bottom thereof.

3. An installation as defined in claim 2, in which said other bed containing chambers enclose one end portion of said central chamber, and in which said vessel is constructed to provide an exchanger collection chamber concentrically arranged with and in communication with the upper end of said central chamber, means for fluidizing the exchangers collected in said collection chamber, and an evacuation conduit for removing the fluidized exchangers.

4. An installation as defined in claim 3, in which said other bed containing chambers enclose the upper end portion of said central chamber and are located between said central chamber and said collection chamber and provide communication between the latter and said central chamber.

5. An installation as defined in claim 4, in which said vessel includes a cover for said central chamber spaced upwardly from the upper end of the latter and having a depending circular wall enclosing the upper part of the side wall of said central chamber in spaced relation, and an open cylindrical receptacle enclosing the upper part of said central chamber and said depending wall in spaced relation, the side wall of said central chamber, the top of said cover and the depending wall thereof forming one of said other bed containing chambers, and said depending wall and the side wall of said cylindrical receptacle forming a second other bed containing chamber, said cover having a side wall enclosing the upper open end of said cylindrical vessel and forming with the latter said collection chamber for the exchangers.

6. An installation as defined in claim 2, in which said bed moving means comprises a tangential inlet for supplying exchangers to a chamber enclosing and in communication with the lower end of said central chamber, said tangential inlet being spaced above the bottom of said enclosing chamber, and a liquid outlet provided in said enclosing chamber below said tangential inlet to draw off effluent in the peripheral zone at the bottom of said central column.

7. An installation as defined in claim 1, in which said other of said two chambers containing a treatment zone has said second inlet thereof located at the bottom of said other chamber, and has said second outlet thereof located intermediate the upper and bottom ends of said other chamber.

8. An installation as defined in claim 1, in which said other of said two chambers containing a treatment zone has said second inlet thereof located intermediate the upper and bottom ends of said other chamber, and has said second outlet thereof located at the bottom of said other chamber.

9. An installation as defined in claim 2, in which said other bed containing chambers include said other of said two chambers and a third chamber in annular communication with the latter, in which said liquid inlet means and said second outlet are constructed and arranged to provide two liquids of different densities in each of such two communicating chambers with the denser liquid in each located below the lighter liquid and separated therefrom by an interface, and in which said control means maintains the interface in one of such two communicating chambers at a different vertical position that that of the interface in the other of such two communicating chambers.

10. A method of treatment of solutions by solid ion exchangers in a mobile bed, comprising providing a single bed of solid ion exchangers in a plurality of successive bed containing chambers concentrically arranged to be in annular communication at the ends thereof so that the bed has a plurality of connected vertically disposed parts, intermittently moving the bed forwardly under the impulsion of liquid through such chambers so that in each such forward movement, parts thereof are simultaneously moved downwardly and upwardly through the communicating bed containing chambers, then during each of the stationary periods of the ion exchangers in such chambers, supplying liquids to said bed so that they flow counter to the movements of bed parts in such chambers and provide separate treatment zones along the length of the compact mobile bed extending continuously in all of such successive chambers, such liquids being supplied to a plural of said chambers so that there are provided in each thereof two liquids of different densities, the lighter liquid being supplied to the upper portions of such plural chambers and the denser liquid being supplied to and extracted from portions of such plural chambers spaced below the places of supply of the lighter liquid thereto and so that there is formed in at least one of such plural chambers an interface between the lighter and denser liquids therein, the places of the supply and extraction of the denser liquid in said one of such plural chambers containing the interface being so located that one of them is intermediate the upper and bottom ends of such one chamber and the other is associated with the bottom end of such one chamber, and the supply of the denser liquid in another of such plural chambers being between the upper and bottom ends thereof and both the lighter and denser liquids supplied to each other chamber being extracted at the bottom thereof, and including the step of controlling the interface in said one of such plural chambers to compensate for changes in position thereof due to the displacement of the ion exchangers in such one chamber.

* * * * *